(12) United States Patent
Halas et al.

(10) Patent No.: US 8,178,202 B2
(45) Date of Patent: May 15, 2012

(54) NONCONCENTRIC NANOSHELLS WITH OFFSET CORE IN RELATION TO SHELL AND METHOD OF USING THE SAME

(75) Inventors: Nancy J. Halas, Houston, TX (US); Hui Wang, Houston, TX (US); Peter J. Nordlander, Houston, TX (US); Yanpeng Wu, Houston, TX (US)

(73) Assignee: William Marsh Rice University, Houston, TX (US)

( * ) Notice: Subject to any disclaimer, the term of this patent is extended or adjusted under 35 U.S.C. 154(b) by 757 days.

(21) Appl. No.: 11/765,862

(22) Filed: Jun. 20, 2007

(65) Prior Publication Data
US 2010/0028680 A1 Feb. 4, 2010

Related U.S. Application Data

(60) Provisional application No. 60/805,442, filed on Jun. 21, 2006.

(51) Int. Cl.
*B32B 1/00* (2006.01)
*B05D 1/18* (2006.01)
(52) U.S. Cl. ......... 428/407; 428/402; 428/403; 428/900
(58) Field of Classification Search .............. 428/407, 428/402, 403, 900
See application file for complete search history.

(56) References Cited

U.S. PATENT DOCUMENTS

| | | | |
|---|---|---|---|
| 6,174,677 B1 | 1/2001 | Vo-Dinh | |
| 6,219,137 B1 | 4/2001 | Vo-Dinh | |
| 6,344,272 B1 | 2/2002 | Oldenburg et al. | |
| 6,428,811 B1 | 8/2002 | West et al. | |
| 6,645,517 B2 | 11/2003 | West et al. | |
| 6,685,986 B2 | 2/2004 | Oldenburg et al. | |
| 6,699,724 B1 | 3/2004 | West et al. | |
| 6,778,316 B2 | 8/2004 | Halas et al. | |
| 7,144,622 B1 | 12/2006 | Stecher et al. | |
| 7,147,687 B2 | 12/2006 | Mirkin et al. | |
| 7,301,624 B2 | 11/2007 | Talley et al. | |
| 7,371,457 B2 | 5/2008 | Oldenburg et al. | |
| 2003/0003300 A1* | 1/2003 | Korgel et al. ................. | 428/402 |

(Continued)

FOREIGN PATENT DOCUMENTS
WO WO2005092286 * 10/2005
(Continued)

OTHER PUBLICATIONS

Sherry, Leif J., et al., "Localized surface plasmon resonance spectroscopy of single silver nanocubes," Nano Letters, 2005, pp. A to E, American Chemical Society.
(Continued)

*Primary Examiner* — Alicia Chevalier
*Assistant Examiner* — Ronak Patel
(74) *Attorney, Agent, or Firm* — Conley Rose, P.C.; Rodney B. Carroll (57) ABSTRACT

A nanoparticle comprising a shell surrounding a core material with a lower conductivity than the shell material, wherein the core center is offset in relation to the shell center. A method comprising providing a nanoparticle comprising a nonconductive core and a conductive shell, and asymmetrically depositing additional conductive material on the conductive shell. A method comprising providing a concentric nanoshell having a core and a shell, immobilizing the concentric nanoshell onto a support, and asymmetrically depositing a conductive material onto the shell to produce a nanoegg.

22 Claims, 5 Drawing Sheets

U.S. PATENT DOCUMENTS

| | | | |
|---|---|---|---|
| 2003/0215638 A1* | 11/2003 | Charnay et al. | 428/403 |
| 2004/0150818 A1* | 8/2004 | Armstrong et al. | 356/301 |
| 2004/0174520 A1 | 9/2004 | Premasiri et al. | |
| 2004/0214001 A1* | 10/2004 | Oldenburg et al. | 428/404 |
| 2004/0229039 A1 | 11/2004 | Wei et al. | |
| 2005/0130324 A1 | 6/2005 | West et al. | |
| 2007/0132043 A1* | 6/2007 | Bradley et al. | 257/414 |
| 2008/0166706 A1* | 7/2008 | Zhang et al. | 435/6 |
| 2008/0176212 A1 | 7/2008 | Halas et al. | |
| 2008/0204742 A1 | 8/2008 | Halas et al. | |
| 2008/0241262 A1* | 10/2008 | Lee et al. | 424/490 |
| 2009/0213369 A1* | 8/2009 | Lee et al. | 356/301 |
| 2010/0009338 A1 | 1/2010 | Zhang et al. | |
| 2010/0022020 A1 | 1/2010 | Halas et al. | |

FOREIGN PATENT DOCUMENTS

| | | | |
|---|---|---|---|
| WO | WO2006099494 | * | 9/2006 |
| WO | 2006135393 | A2 | 12/2006 |
| WO | 2006135393 | A3 | 12/2006 |
| WO | 2008028130 | A1 | 3/2008 |

OTHER PUBLICATIONS

Smallbone, Kieran, et al., "The role of acidity in solid tumour growth and invasion," Journal of Theoretical Biology, 2005, pp. 476-484, vol. 235, Elsevier Ltd.

Su, K.-H., et al., "Interparticle coupling effects on plasmon resonances of nanogold particles," Nano Letters, 2003, pp. 1087-1090, vol. 3, No. 8, American Chemical Society.

Talley, Chad E., et al., "Intracellular pH sensors based on surface-enhanced raman scattering," Analytical Chemistry, Dec. 1, 2004, pp. 7064-7068, vol. 76, No. 23, American Chemical Society.

Talley, Chad E., et al., "Surface-enhanced raman scattering from individual au nanoparticles and nanoparticle dimer substrates," Nano Letters, 2005, pp. 1569-1574, vol. 5, No. 8, American Chemical Society.

Tenenbaum, Joshua B., et al., "A global geometric framework for nonlinear dimensionality reduction," ProQuest Science Journals, Dec. 22, 2000, pp. 2319-2322, vol. 290, Science.

Vaupel, Peter, et al., "Blood flow, oxygen and nutrient supply, and metabolic microenvironment of human tumors: a review," Harvard Medical School, Boston, Massachusetts, Dec. 1, 1989, pp. 6449-6465, vol. 49, Cancer Research.

Wells, Mona, et al., "Interactions between organized, surface-confined monolayers and vapor-phase probe molecules. 9. Structure/reactivity relationship betwen three surface-confined isomers of mercaptobenzoic acid and vapor-phase decylamine," Langmuir, 1996, pp. 1989-1996, vol. 12, No. 8, American Chemical Society.

Xu, Shuping, et al., "Surface-enhanced raman scattering studies on immunoassay," Journal of Biomedical Optics, May/Jun. 2005, pp. 031112-1 to 031112-12, vol. 10, No. 3, SPIE.

Yu, Yu-Ying, et al., "Gold nanorods: electrochemical synthesis and optical properties," The Journal of Physical Chemistry B, Aug. 21, 1997, pp. 6661-6664, vol. 101, No. 34, American Chemical Society.

Zhu, Zihua, et al., "Raman scattering enhancement contributed from individual gold nanoparticles and interparticle coupling," Nanotechnology, 2004, pp. 357-364, vol. 15, Institute of Physics Publishing Ltd., UK.

Aizpurua, J., et al., "Optical properties of gold nanorings," Physical Review Letters, Feb. 7, 2003, pp. 057401-1 to 057401-4, vol. 90, No. 5, The American Physical Society.

Brandl, Daniel W., et al., "Plasmon hybridization in nanoshell dimers," The Journal of Chemical Physics, 2005, pp. 024701-1 to 024701-11, vol. 123, American Institute of Physics.

Chen, Sihai, et al., "Synthesis and characterization of truncated triangular silver nanoplates," Nano Letters, 2002, pp. 1003-1007, vol. 2, No. 9, American Chemical Society.

Fredkin, D. R., et al., Resonant behavior of dielectric objects (electrostatic resonances), Physical Review Letters, Dec. 19, 2003, pp. 253902-1 to 253902-4 vol. 91, No. 25, The American Physical Society.

Futamata, M., et al., "Local electric field and scattering cross section of Ag nanoparticles under surface plasmon resonance by finite difference time domain method," J. Phys. Chem. B, 2003, pp. 7607-7617, vol. 107, American Chemical Society.

Grady, N. K., et al., "Influence of dielectric function properties on the optical response of plasmon resonant metallic nanoparticles," Chemical Physics Letters, 2004, pp. 167-171, vol. 399, Elsevier B.V.

Hao, Encai, et al., "Synthesis and optical properties of "branched" gold nanocrystals," Nano Letters, 2004, pp. 327-330, vol. 4, No. 2, American Chemical Society.

Jackson, J. B., et al., "Silver nanoshells: variations in morphologies and optical properties," J. Phys. Chem. B, 2001, pp. 2743-2746, vol. 105, No. 14, American Chemical Society.

Johnson, P. B., et al., "Optical constants of the noble metals," Dec. 15, 1972, pp. 4370-4379, vol. 6, No. 12, Physical Review B.

Link, Stephan, et al., "Spectral properties and relaxation dynamics of surface plasmon electronic oscillations in gold and silver nanodots and nanorods," J. Phys. Chem. B, 1999, pp. 8410-8426, vol. 103, No. 40, American Chemical Society.

Maier, Stefan A., et al., "Optical pulse propagation in metal nanoparticle chain waveguides," Physical Review B, 2003, pp. 205402-1 to 205402-5, vol. 67, The American Physical Society.

Marton, J. P., et al., "Optical properties of aggregated metal systems: interband transitions," Feb. 15, 1977, pp. 1719-1727, vol. 15, No. 4, Physical Review B.

Michalet, X., et al., Quantum dots for live cells, in vivo imaging, and diagnostics, Jan. 28, 2005, pp. 538-544, vol. 307, Science.

Moskovits, Martin, et al., "Engineering nanostructures for giant optical fields," Chemical Physics Letters, 2004, pp. 91-95, vol. 397, Elsevier B.V.

Nie, Shuming, et al., "Probing single molecules and single nanoparticles by surface-enhanced Raman scattering," Feb. 21, 1997, pp. 1102-1106, vol. 275, Science.

Oubre, C., et al., "Finite-difference time-domain studies of the optical properties of nanoshell dimers," J. Phys. Chem. B, 2005, pp. 10042-10051, vol. 109, No. 20, American Chemical Society.

Ouyang, Feng, et al., "Accurate modeling of particle-substrate coupling of surface plasmon excitation in eels," Ultramicroscopy, 1989, pp. 345-349, vol. 31, Elsevier Science Publishers B.V. (North-Holland).

Pastoriza-Santos, Isabel, et al., "Synthesis of silver nanoprisms in DMF," Nano Letters, 2002, pp. 903-905, vol. 2, No. 8, American Chemical Society.

Prodan, E., et al., "Plasmon hybridization in spherical nanoparticles," Journal of Chemical Physics, Mar. 15, 2004, pp. 5444-5454, vol. 120, No. 11, American Institute of Physics.

Schuck, P. J., et al., "Improving the mismatch between light and nanoscale objects with gold bowtie nanoantennas," Physical Review Letters, Jan. 14, 2005, pp. 017402-1 to 017402-4, vol. 94, The American Physical Society.

Sershen, S. R., et al., "Temperature-sensitive polymer-nanoshell composites for photothermally modulated drug delivery," May 2000, pp. 293-298, John Wiley & Sons, Inc.

Shvets, Gennady, et al., "Engineering the electromagnetic properties of periodic nanostructures using electrostatic resonances," Physical Review Letters, Dec. 10, 2004, pp. 243902-1 to 243902-4, vol. 93, The American Physical Society.

Sun, Yugang, et al., "Shape-controlled synthesis of gold and silver nanoparticles," Dec. 13, 2002, pp. 2176-2179, vol. 298, Science.

Tam, Felicia, et al., "Geometrical parameters controlling sensitivity of nanoshell plasmon resonances to changes in dielectric environment," J. Phys. Chem. B, 2004, pp. 17290-17294, vol. 108, American Chemical Society.

Varsányi, György, et al., "Assignments for vibrational spectra of seven hundred benzene derivatives," 1974, 1 page, Wiley, New York.

Westcott, S. L., et al., "Relative contributions to the plasmon line shape of metal nanoshells," Physical Review B, 2002, pp. 155431-1 to 155431-5, vol. 66, The American Physical Society.

Xu, Hongxing, et al., "Spectroscopy of single hemoglobin molecules by surface enhanced Raman scattering," Physical Review Letters, Nov. 22, 1999, pp. 4357-4360, vol. 83, No. 21, The American Physical Society.

Xu, Hongxing, et al., "Polarization-dependent surface-enhanced Raman spectroscopy of isolated silver nanoaggregates," ChemPhysChem, 2003, pp. 1001-1005, vol. 4, Wiley-VCH Verlag GmbH & Co. KGaA, Weinheim.

Burges, Christopher J. C., "Geometric methods for feature extraction and dimensional reduction," Chapter 1, The Data Mining and Knowledge Discovery Handbook, 2005, pp. 1-34 plus 1 cover page and 1 publishing page, Springer Science+Business Media, Inc., New York, New York, USA.

Chance, R. R., et al., "Molecular fluorescence and energy transfer near interfaces," Advances in Chemical Physics, vol. XXXVII, 1978, pp. 1-65 plus 1 cover page, 1 publishing page, and 1 contents page, John Wiley & Sons, Inc., New York, USA.

Murphy, Catherine J., et al., "Surfactant-directed synthesis and optical properties of one-dimensional plasmonic metallic nanostructures," www.mrs.org/publications/bulletin, May 2005, pp. 349-355, vol. 30, MRS Bulletin.

Oubre, Chris, et al., "Optical properties of metallodielectric nanostructures calculated using the finite difference time domain method," J. Phys. Chem. B, 2004, pp. 17740-17747, vol. 108, No. 46, American Chemical Society.

Sullivan, Dennis M., "Electromagnetic simulation using the FDTD method," 2000, 4 pages, Institute of Electrical and Electronics Engineers, Inc., New York, New York, USA.

Taflove, Allen, et al., "Computational electrodynamics: the finite-difference time-domain method," Second Edition, 2000, 3 pages, Artech House, Inc. Boston, Massachusetts, USA.

"Experimental setup (Raman + STM)," http://w3.rz-berlin.mpg.de/pc/shg/shg_sers/Tip_enhanced/page3.html, 2004, 2 pages, Fritz-Haber-Institut der Max-Planck-Gesellschaft.

Provisional patent application entitled "Detection of molecular and biomolecular species by surface-enhanced Raman scattering: nanoengineered substrates for SERS detection" by Nancy J. Halas, et al., filed Aug. 13, 2004 as U.S. Appl. No. 60/601,319.

Provisional patent application entitled "All-optical nanoscale pH meter," by Nancy J. Halas, et al., filed Jun. 14, 2006 as U.S. Appl. No. 60/804,793.

Provisional patent application entitled "Nonconcentric nanoshells (nanoeggs) and their applications as substrates for surface enhanced Raman scattering" by Nancy J. Halas, et al., filed Jun. 21, 2006 as U.S. Appl. No. 60/805,442.

Pettinger, Bruno, et al., "A fine needle boosts light scattering," TERS highlights, http://w3.rz-berlin.mpt.de/pc/shg/shg_sers/Tip_enhanced/page1b_Highlight.html, 2004, 2 pages, Fritz-Haber-Institut der Max-Planck-Gesellschaft.

Office Action (Final) dated Apr. 8, 2009 (26 pages), U.S. Appl. No. 11/573,365, filed Aug. 20, 2007.

"SEM images of the tip," http://w3.rz-berlin.mpg.de/pc/shg/shg_sers/Tip_enhanced/page2.html, 2004, 2 pages, Fritz-Haber-Institut der Max-Planck-Gesellschaft.

"Surface enhanced Raman spectroscopy (SERS)," SERS mechanisms, http://w3.rz-berlin.mpg.de/pc/shg/shg_sers/Tip_enhanced/page2.html, 2004, 7 pages, Frirz-Haber-Institut der Max-Planck-Gesellischaft.

"TERS introduction," http://w3.rz-berlin.mpg.de/pc/shg_sers/Tip_enhanced/page1.html, 2004, 2 pages, Fritz-Haber- Institut der Max-Planck-Gesellschaft.

"TERS results/Raman spectra," http://w3.rx-berlin.mpg.de/pc/shg/shg_sers/Tip_enhanced/page4.html, 2004, 2 pages, Fritz-Haber-Institut der Max-Planck-Gesellschaft.

Walker, Christopher, et al., "SERS—surface enhanced Raman scattering," Surface Science Techniques, http://www.uksaf.org/tech/sers.html, 1998, 2 pages, UK Surface Analysis Forum.

Wegner, Matthias, "SPR—surface plasmon resonance," Surface Science Techniques, http://www.uksaf.org/tech/spr.html, Mar. 9, 2009, 2 pages.

Aden, Arthur L, et al., "Scattering of electromagnetic waves from two concentric spheres," Oct. 1951, pp. 1242-1246, vol. 22, No. 10, Journal of Applied Physics.

Beversluis, Michael R., et al., "Continuum generation from single gold nanostructures through near-field mediated intraband transitions," Physical Review B, 2003, pp. 115433-1 to 115433-10, vol. 68, The American Physical Society.

Chen, Jingyi, et al., "Gold nanocages: bioconjugation and their potential use as optical imaging contrast agents," Nano Letters, 2005, pp. 473-477, vol. 5, No. 3, American Chemical Society.

Chen, Sihai, et al., "Monopod, bipod, tripod, and tetrapod gold nanocrystals," J. Am. Chem. Soc., 2003, pp. 16186-16187, vol. 125, No. 52, American Chemical Society.

Chumanov, George, et al., "Unusual extinction spectra of nanometer-sized silver particles arranged in two dimensional arrays," J. Phys. Chem., 1996, pp. 5166-5168, vol. 100, No. 13, American Chemical Society.

Clark, Heather A., et al., "Optical nanosensors for chemical analysis inside single living cells. 1. Fabrication, characterization, and methods for intracellular delivery of PEBBLE sensors," Analytical Chemistry, Nov. 1, 1999, pp. 4831-4836, vol. 71, No. 21, American Chemical Society.

Clark, Heather A., et al., "Subcellular optochemical nanobiosensors: probes encapsulated by biologically localised embedding (PEBBLEs)," Sensors and Actuators B, 1998, pp. 12-16, vol. 51, Elsevier Science S. A.

Félidj, N., et al., "Optimized surface-enhanced raman scattering on gold nanoparticle arrays," Applied Physics Letters, May 5, 2003, pp. 3095-3097, vol. 82, No. 18, American Institute of Physics.

Foreign Communication from a related counterpart application—International Search Report and Written Opinion, PCT/US05/28967, May 4, 2007, 9 pages.

Gao, Ping, et al., "Surface-enhanced raman spectroscopy as a probe of adsorbate-surface bonding: benzene and monosubstituted benzenes adsorbed at gold electrodes," Office of Naval Research, Contract N00014-79-C-0670, Technical Report No. 51, Aug. 1985, 32 pages, Journal of Physical Chemistry.

Hallen, H. D., et al., "Raman spectroscopy: probing the border between near-field and far-field spectroscopy," SPIE Proceedings, 1998, 3 pages.

Härdle, Wolfgang, "Applied nonparametric regression," 1990, 2 pages, Cambridge University Press, USA.

Haslett, T. L., et al., "Can surface-enhanced raman scattering serve as a channel for strong optical pumping?" Journal of Chemical Physics, Jul. 22, 2000, pp. 1641-1646, vol. 113, No. 4, American Institute of Physics.

Haynes, Christy L., et al., "Plasmon-sampled surface-enhanced raman excitation spectroscopy," J. Phys. Chem. B, 2003, pp. 7426-7433, vol. 107, No. 30, American Chemical Society.

Hirsch, L. R., et al., "A rapid, whole blood immunoassay using metal nanoshells," 25th Annual International Conference of the IEEE EMBS, Cancun, Mexico, Sep. 17-21, 2003, pp. 3442-3443, IEEE.

Hirsch, L. R., et al., "A whole blood immunoassay using gold nanoshells," Analytical Chemistry, May 15, 2003, pp. 2377-2381, vol. 75, No. 10, American Chemical Society.

Hirsch, L. R., et al., "Nanoshell-mediated near-infrared thermal therapy of tumors under magnetic resonance guidance," PNAS, Nov. 11, 2003, pp. 13549-13554, vol. 100, No. 23, The National Academy of Sciences of the USA.

Huang, Xiaohua, et al., "Cancer cell imaging and photothermal therapy in the near-infrared region by using gold nanorods," J. Am. Chem. Soc., 2006, pp. 2115-2120, vol. 128, No. 6, American Chemical Society.

Jackson, J. B., et al., "Controlling the surface enhanced raman effect via the nanoshell geometry," Applied Physics Letters, Jan. 13, 2003, pp. 257-259, vol. 82, No. 2, American Institute of Physics.

Jackson, J. B., et al., "Surface-enhanced raman scattering on tunable plasmonic nanoparticle substrates," PNAS, Dec. 28, 2004, pp. 17930-17935, vol. 101, No. 52, The National Academy of Sciences of the USA.

Jeanmaire, David L., et al., "Surface raman spectroelectrochemistry. Part I. Heterocyclic, aromatic, and aliphatic amines adsorbed on the anodized silver electrode," J. Electroanal. Chem., 1977, pp. 1-20, vol. 84, Elsevier Sequouia S.A., Lausanne, The Netherlands.

Jin, Rongchao, et al., "Photoinduced conversion of silver nanospheres to nanoprisms," www.sciencemag.org, Nov. 30, 2001, pp. 1901-1903, vol. 294, Science.

Joo, Tai Ha, et al., "Surface-enhanced raman scattering (SERS) of 1-propanethiol in silver sol," 1986, pp. 5816-5819, vol. 90, No. 22, American Chemical Society.

Kerker, Milton, et al., "Surface enhanced raman scattering (SERS) by molecules adsorbed at spherical particles: errata," Applied Optics, Dec. 15, 1980, pp. 4159-4174, vol. 19, No. 24, Optical Society of America.

Kneipp, Katrin, et al., "Population pumping of excited vibrational states by spontaneous surface-enhanced raman scattering," Physical Review Letters, Apr. 1, 1996, pp. 2444-2447, vol. 76, No. 14, The American Physical Society.

Kneipp, Katrin, et al., "Single molecule detection using surface-enhanced raman scattering (SERS)," Physical Review Letters, Mar. 3, 1997, pp. 1667-1670, vol. 78, No. 9, The American Physical Society.

Kwon, Yong Joon, et al., "Vibrational spectroscopic investigation of benzoic acid adsorbed on silver," The Journal of Physical Chemistry, 1994, pp. 8481-8487, vol. 98, No. 34, American Chemical Society.

Lee, Sang Bok, et al., "Surface-enhanced raman scattering of o-mercaptobenzoic acid in silver sol," Journal of Raman Spectroscopy, 1991, pp. 811-817, vol. 22, John Wiley & Sons, Ltd.

Loo, Christopher, et al., "Gold nanoshell bioconjugates for molecular imaging in living cells," Optics Letters, May 1, 2005, pp. 1012-1014, vol. 30, No. 9, Optical Society of America.

Loo, Christopher, et al., "Immunotargeted nanoshells for integrated cancer imaging and therapy," 2005, pp. 709-711, vol. 5, No. 4, American Chemical Society.

Malynych, Serhiy, et al., "Poly(vinyl pyridine) as a universal surface modifier for immobilization of nanoparticles," J. Phys. Chem. B, 2002, pp. 1280-1285, vol. 106, No. 6, American Chemical Society.

Martell, Arthur E., et al., "Critical stability constants. vol. 1: amino acids," 1974, 2 pages, Plenum Press, New York.

Michota, A., et al., "Surface-enhanced raman scattering (SERS) of 4-mercaptobenzoic acid on silver and gold substrates," Journal of Raman Spectroscopy, 2003, pp. 21-25, vol. 34, John Wiley & Sons, Ltd.

Mie, G, "Contributions to the optics of turbid media, particularly of colloidial metal solutions," translation of "Annalen der Physik, 25, 3, 377-445 (1908)", Feb. 2, 1976, 73 pages, Royal Aircraft Establishment.

Mohri, Nobuyuki, et al., "Desorption of 4-aminobenzenethiol bound to a gold surface," Langmuir, 1998, pp. 2343-2347, vol. 14, No. 9, American Chemical Society.

Moskovits, M., et al., "The geometry of several molecular ions adsorbed on the surface of colloidal silver," The Journal of Physical Chemistry, 1984, pp. 1293-1298, vol. 88, No. 7, American Chemical Society.

Moskovits, Martin, "Surface-enhanced spectroscopy," Reviews of Modern Physics, Jul. 1985, pp. 783-826 plus 2 figures, vol. 57, No. 3, The American Physical Society.

Nordlander, P., et al., "Plasmon hybridization in nanoparticle dimers," Nano Letters, 2004, pp. 899-903, vol. 4, No. 5, American Chemical Society.

Oldenburg, S. J., et al., "Infrared extinction properties of gold nanoshells," Applied Physics Letters, Nov. 8, 1999, pp. 2897-2899, vol. 75, No. 19, American Institute of Physics.

Oldenburg, S. J., et al, "Light scattering from dipole and quadrupole nanoshell antennas," Applied Physics Letters, Aug. 23, 1999, pp. 1063-1065, vol. 75, No. 8, American Institute of Physics.

Oldenburg, S. J., et al., "Nanoengineering of optical resonances," Chemical Physics Letters, May 22, 1998, pp. 243-247, vol. 288, Elsevier Science B.V.

O'Neal, D. Patrick, et al., "Photo-thermal tumor ablation in mice using near infrared-absorbing nanoparticles," 2004, pp. 171-176, vol. 209, Elsevier Ltd.

Osawa, Masatoshi, et al., "Charge transfer resonance raman process in surface-enhanced raman scattering from p-aminothiophenol adsorbed on silver: Herzberg—Teller contribution," J. Phys. Chem., 1994, pp. 12702-12707, vol. 98, No. 48, American Chemical Society.

Office Action dated Aug. 25, 2008 (9 pages), U.S. Appl. No. 11/573,365, filed Aug. 20, 2007.

Prodan, E., et al., "A hybridization model for the plasmon response of complex nanostructures," www.sciencemag.org, Oct. 17, 2003, pp. 419-422, vol. 302, Science.

Radloff, C., et al., "Enhanced thermal stability of silica-encapsulated metal nanoshells," Applied Physics Letters, Jul. 30, 2001, pp. 674-676, vol. 79, No. 5, American Institute of Physics.

Rall, Jonathan, "Lidar for atmospheric trace gas detection," Geoscience and Remote Sensing Society Instrumentation and Future Technologies Committee (GRSS-IFT), http://www.ewh.ieee.org/soc/grss/ift/rall16.html, 2002, 5 pages, Geoscience and Remote Sensing Society.

Ramakrishna, R. S., et al., "Complexes of thallium(I) and thallium(III) with thiosalicylic acid (o-mercaptobenzoic acid) and salicylic acid," J. inorg. nucl. Chem., 1971, pp. 1940-1942, vol. 33, Pergamon Press, Great Britian.

Rechberger, W., et al., "Optical properties of two interacting gold nanoparticles," Optics Communications, 2003, pp. 137-141, vol. 220, Elsevier Science B.V.

Roweis, Sam T., et al., "Nonlinear dimensionality reduction by locally linear embedding," www.sciencemag.org, Dec. 22, 2000, pp. 2323-2326, vol. 290, Science.

Office Action dated Nov. 8, 2010 (36 pages), U.S. Appl. No. 11/762,430, filed Jun. 13, 2007.

Al-Rawashdeh, Nathir, et al., "UV/visible and infrared spectra of polyethylene/nanoscopic gold rod composite films: effects of gold particle size, shape and orientation," NanoStructured Materials, 1997, pp. 383-386, vol. 9, Elsevier Science Ltd, Acta Metallurgica Inc.

Angel, S. M., et al., "Near-infrared surface-enhanced raman spectroscopy. Part II: copper and gold colloids," Applied Spectroscopy, 1989, pp. 367-372, vol. 43, No. 3, Society for Applied Spectroscopy.

Aslan, Kadir, et al., "Metal-enhanced fluorescence: an emerging tool in biotechnology," Biotechnology, 2005, pp. 55-62, vol. 16, Elsevier Ltd.

Badilescu, Simona, et al., "Enhanced infrared ATR spectra of o-, m-, and p-nitrobenzoic acid with Ag films," Applied Spectroscopy, 1989, pp. 549-552, vol. 43, No. 3, Society for Applied Spectroscopy.

Barnes, William L., et al., "Surface plasmon subwavelength optics," Nature, Aug. 14, 2003, pp. 824-830, vol. 424, Nature Publishing Group.

Brandl, Daniel W., et al., "Plasmon modes of nanosphere trimers and quadrumers," J. Phys. Chem. B, 2006, pp. 12302-12310, vol. 110, No. 25, American Chemical Society.

Cao, Linyou, et al., "Surface-enhanced raman scattering of p-anninothiophenol on a Au(core)/Cu(shell) nanoparticle assembly," ChemPhysChem, 2005, pp. 913-918, vol. 6, Wiley-VCH Verlag GmbH & Co. KGaA, Weinheim.

Cao, Yunwei Charles, et al., "Nanoparticles with raman spectroscopic fingerprints for DNA and RNA detection," www.sciencemag.org, Aug. 30, 2002, pp. 1536-1540, vol. 297, Science.

Chase, D. B., et al., "Surface-enhanced raman spectroscopy in the near-infrared," Applied Spectroscopy, 1988, pp. 1186-1187, vol. 42, No. 7, Society for Applied Spectroscopy.

Crookell, A., et al., "Surface-enhanced fourier transform raman spectroscopy in the near infrared," Chemical Physics Letters, Aug. 12, 1988, pp. 123-127, vol. 149, No. 2, Elsevier Science Publishers B.V. (North-Holland Physics Publishing Division).

Ebbesen, T. W., et al., "Extraordinary optical transmission through sub-wavelength hole arrays," Nature, Feb. 12, 1998, pp. 667-669, vol. 391, Macmillan Publishers Ltd.

Elghanian, Robert, et al., "Selective colorimetric detection of polynucleotides based on the distance-dependent optical properties of gold nanoparticles," www.sciencemag.org, Aug. 22, 1997, pp. 1078-1081, vol. 277, Science.

Foreign communication from the priority application—International Preliminary Report on Patentability, PCT/US2007/077389, Mar. 3, 2009, 6 pages.

Foreign communication from the priority application—International Search Report and Written Opinion, PCT/US07/77389, Jan. 29, 2008, 6 pages.

Genov, Dentcho A., et al., "Resonant field enhancements from metal nanoparticle arrays," Nano Letters, 2004, pp. 153-158, vol. 4, No. 1, American Chemical Society.

Goutev, Nikolay, et al., "Attenuated total reflection surface-enhanced infrared absorption spectroscopy of carboxyl terminated self-assembled monolayers on gold," Applied Spectroscopy, 2003, pp. 506-513, vol. 57, No. 5, Society for Applied Spectroscopy.

Haes, Amanda J., et al., "Plasmonic materials for surface-enhanced sensing and spectroscopy," www.mrs.org/publications/bulletin, May 2005, pp. 368-375, vol. 30, MRS Bulletin.

Halas, Naomi, "Playing with plasmons: tuning the optical resonant properties of metallic nanoshells," www.mrs.org/publications/bulletin, May 2005, pp. 362-367, vol. 30, MRS Bulletin.

Hartstein, A., et al., "Enhancement of the infrared absorption from molecular monolayers with thin metal overlayers," Physical Review Letters, Jul. 21, 1980, pp. 201-204, vol. 45, No. 3, The American Physical Society.

Heaps, David A., et al., "Band shapes in the infrared spectra of thin organic films on metal nanoparticles," Vibrational Spectroscopy, 2006, pp. 45-50, vol. 42, Elsevier B.V.

Heaps, David A., et al., "Effect of molecular spacers on surface-enhanced attenuated total reflection infrared spectra of bulk liquids," Vibrational Spectroscopy, 2006, pp. 221-224, vol. 41, Elsevier B.V.

Jensen, T. R., et al., "Surface-enhanced infrared spectroscopy: a comparison of metal island films with discrete and nondiscrete surface plasmons," Applied Spectroscopy, 2000, pp. 371-377, vol. 54, No. 3, Society for Applied Spectroscopy.

Johnson, Eric, et al., "Surface-enhanced infrared spectroscopy of monolayers," J. Phys. Chem., 1995, pp. 9325-9330, vol. 99, No. 23, American Chemical Society.

Johnson, S. A., et al., "Application of surface-enhanced infrared absorption spectroscopy as a sensor for volatile organic compounds," Applied Spectroscopy, 1997, pp. 1423-1426, vol. 51, No. 9, Society for Applied Spectroscopy.

Kellner, R., et al., "Surface-enhanced vibrational spectroscopy: a new tool in chemical IR sensing?" Applied Spectroscopy, 1997, pp. 495-503, vol. 51, No. 4, Society for Applied Spectroscopy.

Krauth, Oliver, et al., "Anomalous infrared transmission of adsorbates on ultrathin metal films: Fano effect near the percolation threshold," Journal of Chemical Physics, Oct. 15, 2000, pp. 6330-6333, vol. 113, No. 15, American Institute of Physics.

Krauth, O., et al., "Asymmetric line shapes and surface enhanced infrared absorption of CO adsorbed on thin iron films on MgO(001)," Journal of Chemical Physics, Feb. 8, 1999, pp. 3113-3117, vol. 110, No. 6, American Institute of Physics.

Kreibig, Uwe, et al., "Optical properties of metal clusters," Jul. 7, 1995, 4 pages, Springer.

Lal, Surbhi, et al., "Profiling the near field of a plasmonic nanoparticle with raman-based molecular rulers," Nano Letters, 2006, pp. 2338-2343, vol. 6, No. 10, American Chemical Society.

Lee, Seung Joon, et al., "Hot spots in silver nanowire bundles for surface-enhanced raman spectroscopy," J. Am. Chem. Soc., 2006, pp. 2200-2201, vol. 128, No. 7, American Chemical Society.

Levin, Carly S., et al., "Determining the conformation of thiolated poly(ethylene glycol) on Au nanoshells by surface-enhanced Raman scattering spectroscopic assay," Analytical Chemistry, May 15, 2006, pp. 3277-3281, vol. 78, No. 10, American Chemical Society.

Li, Kuiru, et al., "Self-similar chain of metal nanospheres as an efficient nanolens," Physical Review Letters, Nov. 28, 2003, pp. 227402-1 to 227402-4, vol. 91, No. 22, The American Physical Society.

Maier, Stefan A., et al., "Plasmonics—a route to nanoscale optical devices," Advanced Materials, Oct. 2, 2001, pp. 1501-1505, vol. 13, No. 19, Wiley-VCH Verlag GmbH, D-69469 Weinheim.

Maier, Stefan A., et al., "Plasmonics: localization and guiding of electromagnetic energy in metal/dielectric structures," Journal of Applied Physics, 2005, pp. 011101-1 to 011101-10, vol. 98, American Institute of Physics.

Makino, Nobuaki, et al., "Characterization of surface contaminants by a silver film-enhanced IR—Johnson method," Applied Spectroscopy, 1997, pp. 1460-1463, vol. 51, No. 10, Society for Applied Spectroscopy.

McNutt, A., et al., "RAIRS investigations on the orientation and intermolecular interactions of adenine on Cu(110)," Surface Science, 2003, pp. 131-144, vol. 531, Elsevier Science B.V.

Merklin, Gregory T., et al., "Influence of chemical interactions on the surface-enhanced infrared absorption spectrometry of nitrophenols on copper and silver films," Langmuir, 1997, pp. 6159-6163, vol. 13, No. 23, American Chemical Society.

Michaels, Amy M., et al., "Ag nanocrystal junctions as the site for surface-enhanced raman scattering of single rhodamine 6G molecules," J. Phys. Chem. B, 2000, pp. 11965-11971, vol. 104, No. 50, American Chemical Society.

Michaels, Amy M., et al., "Surface enhanced raman spectroscopy of individual rhodamine 6G molecules on large Ag nanocrystals," J. Am. Chem. Soc., 1999, pp. 9932-9939, vol. 121, No. 43, American Chemical Society.

Nikoobakht, B., et al., "Self-assembly of gold nanorods," J. Phys. Chem. B, 2000, pp. 8635-8640, vol. 104, No. 36, American Chemical Society.

Office Action dated Dec. 16, 2010 (19 pages), U.S. Appl. No. 12/439,251, filed Jul. 16. 2009.

Orendorff, Christopher J., et al., "pH-triggered assembly of gold nanorods," Langmuir, 2005, pp. 2022-2026, vol. 21, No. 5, American Chemical Society.

Osawa, Masatoshi, "Dynamic processes in electrochemical reactions studied by surface-enhanced infrared absorption spectroscopy (SEIRAS)," Bull. Chem. Soc. Jpn., 1997, pp. 2861-2880, vol. 70, The Chemical Society of Japan.

Osawa, Masatoshi, et al., "In-situ and real-time surface-enhanced infrared study of electrochemical reactions," Applied Spectroscopy, 1997, pp. 512-518, vol. 51, No. 4, Society for Applied Spectroscopy.

Osawa, Masatoshi, "Surface-enhanced infrared absorption," Topics Appl. Phys., 2001, pp. 163-187, vol. 81, Springer-Verlag Berlin Heidelberg.

Osawa, Masatoshi, et al., "Surface-enhanced infrared spectroscopy: the origin of the absorption enhancement and band selection rule in the infrared spectra of molecules adsorbed on fine metal particles," 1993, pp. 1497-1502, vol. 47, No. 9, Society for Applied Spectroscopy.

Ozbay, Ekmel, "Plasmonics: merging photonics and electronics at nanoscale dimensions," www.sciencemag.org, Jan. 13, 2006, pp. 189-193, vol. 311, Science.

Provisional patent application entitled "Nanoshell aggregates as efficient substrate for surface enhanced infrared absorption spectroscopy (SEIRA)," by Nancy J. Halas, et al., filed Sep. 1, 2006 as U.S. Appl. No. 60/842,089.

Pendry, J. B., "Negative refraction makes a perfect lens," Physical Review Letters, Oct. 30, 2000, pp. 3966-3969, vol. 85, No. 18, The American Physical Society.

Priebe, A., et al., "The correlation between film thickness and adsorbate line shape in surface enhanced infrared absorption," Sep. 1, 2003, pp. 4887-4890, vol. 119, No. 9, American Institute of Physics.

Prodan, E., et al., "Effects of dielectric screening on the optical properties of metallic nanoshells," Chemical Physics Letters, 2003, pp. 94-101, vol. 368, Elsevier Science B.V.

Prodan, E., et al., "Structural tunability of the plasmon resonances in metallic nanoshells," Nano Letters, 2003, pp. 543-547, vol. 3, No. 4, American Chemical Society.

Prodan, E., et al., "The effect of a dielectric core and embedding medium on the polarizability of metallic nanoshells," Chemical Physics Letters, 2002, pp. 325-332, vol. 360, Elsevier Science B.V.

Rodriguez, Kenneth R., et al., "Enhanced infrared absorption spectra of self-assembled alkanethiol monolayers using the extraordinary infrared transmission of metallic arrays of subwavelength apertures," Journal of Chemical Physics, Nov. 8, 2004, pp. 8671-8675, vol. 121, No. 18, American Institute of Physics.

Röseler, Arnulf, et al., "Infrared-optical characterization of metallic island films," Applied Spectroscopy, 1997, pp. 902-904, vol. 51, No. 6, Society for Applied Spectroscopy.

Sato, Shinri, et al., "Study of surface-enhanced IR absorption spectroscopy over evaporated Au films in an ultrahigh vacuum system," Applied Spectroscopy, 1997, pp. 1170-1175, vol. 51, No. 8, Society for Applied Spectroscopy.

Schneider, Grégory, et al., "Distance-dependent fluorescence quenching on gold nanoparticles ensheathed with layer-by-layer assembled polyelectrolytes," Nano Letters, 2006, pp. 530-536, vol. 6, No. 3, American Chemical Society.

Schrader, Bernhard, Editor, "Infrared and raman spectroscopy—methods and applications," 1995, 1 cover page and 1 publishing page, published jointly by VCH Verlagsgesellschaft mbH, Weinheim (Federal Republic of Germany) and VCH Publishers, Inc., New York, N.Y. (USA).

Tam, Felicia, et al., "Plasmonic enhancement of molecular fluorescence," Nano Letters, 2007, pp. 496-501, vol. 7, No. 2, American Chemical Society.

Wang, Hui, et al., "Nanosphere arrays with controlled sub-10-nm gaps as surface-enhanced raman spectroscopy substrates," J. Am. Chem. Soc., 2005, pp. 14992-14993, vol. 127, No. 43, American Chemical Society.

Wang, Hui, et al., "Plasmonic nanoparticle heterodimers in a semiembedded geometry fabricated by stepwise upright assembly," Nano Letters, 2006, pp. 2945-2948, vol. 6, No. 12, American Chemical Society.

Wang, Hui, et al., "Plasmonic nanostructures: artificial molecules," Accounts of Chemical Research, 2007, pp. 53-62, vol. 40, No. 1, American Chemical Society.

Zhou, Qun, et al., "Charge transfer between metal nanoparticles interconnected with a functionalized molecule probed by surface-enhanced raman spectroscopy," Angew. Chem. Int. Ed., 2006, pp. 3970-3973, vol. 45, Wiley-VCH Verlag GmbH & Co. KGaA, Weinheim.

Office Action (Final) dated Mar. 21, 2011 (22 pages), U.S. Appl. No. 15/439,251, filed Jul. 16, 2009.

Office Action (Final) dated Mar. 21, 2011 (22 pages), U.S. Appl. No. 12/439,251, filed Jul. 16, 2009.

Office Action (Final) dated Apr. 15, 2011 (33 pages), U.S. Appl. No. 11/762,430, filed Jun. 13, 2007.

Advisory Action dated May 27, 2011 (4 pages), U.S. Appl. No. 12/439,251, filed Jul. 16, 2009.

Notice of Allowance dated Jul. 6, 2011 (9 pages), U.S. Appl. No. 11/762,430, filed Jun. 13, 2007.

* cited by examiner

NONCONCENTRIC NANOSHELLS WITH OFFSET CORE IN RELATION TO SHELL AND METHOD OF USING THE SAME

CROSS-REFERENCE TO RELATED APPLICATIONS

The present application claims priority to U.S. Provisional Application Ser. No. 60/805,442 filed Jun. 21, 2006 and entitled "Nonconcentric Nanoshells (Nanoeggs) and Their Applications as Substrates for Surface Enhanced Raman Scattering" which is incorporated by reference.

STATEMENT REGARDING FEDERALLY SPONSORED RESEARCH OR DEVELOPMENT

This invention was made with government support, or in part, under grant number W911NF-04-1-0203 awarded by the U.S. Armor Research Laboratory and U.S. Army Research Office, grant numbers EEC-0304097 and ECS-0421108 awarded by the National Science Foundation, and grant numbers C-1220 and C-1222 awarded by the Robert A. Welch Foundation. The Government has certain rights in the invention.

BACKGROUND

The optical properties of metallic nanostructures are a topic of considerable scientific and technological importance. The optical properties of a metallic nanoparticle are determined by its plasmon resonances, which are strongly dependent on particle geometry. The structural tunability of plasmon resonances has been one of the reasons for the growing interest in a rapidly expanding array of nanoparticle geometries, such as nanorods, nanorings, nanocubes, triangular nanoprisms, nanoshells, and branched nanocrystals. The resonant excitation of plasmons can lead to large local enhancements of the incident electromagnetic field at the nanoparticle surface, resulting in dramatically large enhancements of the cross section for nonlinear optical spectroscopies such as surface-enhanced Raman scattering. The structural dependence of both the local-field and far-field optical properties of nanoparticles across the visible and near-infrared (NIR) spectral regions has enabled their use in a wide range of biomedical applications, an area of increasing importance and societal impact.

Metallic nanoshells, composed of a spherical dielectric core surrounded by a concentric metal shell, support plasmon resonances whose energies are determined sensitively by inner core and outer shell dimensions. This geometric dependence arises from the hybridization between cavity plasmons supported by the inner surface of the shell and the sphere plasmons of the outer surface. This interaction results in the formation of two hybridized plasmons, a low-energy symmetric or "bonding" plasmon and a high-energy antisymmetric or "antibonding" plasmon mode. The bonding plasmon interacts strongly with an incident optical field, whereas the antibonding plasmon mode interacts only weakly with the incident light and can be further damped by the interband transitions in the metal. For a spherically symmetric nanoshell, where the center of the inner shell surface is coincident with the center of the outer shell surface, plasmon hybridization only occurs between cavity and sphere plasmon states of the same angular momentum, denoted by multipolar index l ($\Delta l=0$). In the dipole, or electrostatic limit, only the l=1 dipolar bonding plasmon is excited by an incident optical plane wave. These selection rules allow for a limited number of transitions which result in a limited number of optical features. One method to increase the utility of these materials would be to increase the number of optical features associated with the nanoparticles. Thus it would be desirable to develop metallic nanostructures having enhanced optical properties.

SUMMARY OF THE INVENTION

Disclosed herein is a nanoparticle comprising a shell surrounding a core material with a lower conductivity than the shell material, wherein the core center is offset in relation to the shell center.

Also disclosed herein is a method comprising providing a nanoparticle comprising a nonconductive core and a conductive shell, and asymmetrically depositing additional conductive material on the conductive shell.

Further disclosed herein is a method comprising providing a concentric nanoshell having a core and a shell, immobilizing the concentric nanoshell onto a support, and asymmetrically depositing a conductive material onto the shell to produce a nanoegg.

DETAILED DESCRIPTION

Disclosed herein are nanoparticles comprising a dielectric core and a conducting shell. Each of these will be described in more detail later herein. In some embodiments, the core comprises silicon dioxide and the shell comprises at least one metal. In an embodiment, these nanoparticles have the core center displaced in relation to the shell center. Nanoparticles having this displaced or offset core center in relation to the shell center are hereinafter termed nanoeggs. In an embodiment, a method of preparing a nanoegg comprises the asymmetric deposition of a metal or metal-like material onto a precursor nanoparticle having a concentric core and shell layer; such precursor nanoparticles may be referred to as nanoshells. Nanoeggs of the type described herein may display enhanced optical properties (e.g., an enhanced surface enhanced Raman scattering (SERS) spectral response) when compared to similar materials having a concentric core and shell.

The precursor nanoparticles, also referred to as nanoshells, of this disclosure may comprise at least two layers. At least one layer is immediately adjacent to and surrounds another layer. The innermost layer is termed the core. The layer that surrounds the core is termed the shell layer. The shell layer may be metallic in nature in that it is comprised of a material that is electrically conductive such as for example a metal or metal-like material. In some embodiments, at least one shell layer readily conducts electricity; alternatively at least one shell layer has a lower dielectric constant than the adjacent inner or core layer. In some embodiments, this metal or metal-like shell layer is the outermost layer. In other embodiments, the shell layer immediately adjacent to the core is not the outer most shell layer. Additional layers, such as a non-conducting layer, a conducting layer, or a sequence of such layers, such as an alternating sequence of non-conducting and conducting layers, may be bound to this shell layer. Thus, for the purposes of this disclosure the term conductor is defined by reference to the adjacent inner layer and includes any material having a lower dielectric constant than its immediately adjacent inner layer.

In an embodiment, the adjacent inner or core layer to the shell layer is a non-conducting layer. Specifically contemplated are non-conducting layers made of dielectric materials and semiconductors. Suitable dielectric materials include but are not limited to silicon dioxide, titanium dioxide, polymethyl methacrylate (PMMA), polystyrene, gold sulfide and macromolecules such as dendrimers.

In an embodiment, the nanoshell comprises a nonconducting core layer which may be a monodisperse, spherical particle that is easily synthesized in a wide range of sizes, and has a surface that can be chemically derivatized. In some embodiments, the core is spherical in shape; alternatively the core may have other shapes such as cubical, cylindrical, ellipsoidal, or hemispherical. Regardless of the geometry of the core, the particles may be homogenous in size and shape. In an embodiment, the nonconducting layer or core material comprises monodisperse colloidal silica.

In an embodiment, the nanoegg comprises a conducting shell layer comprising a metallic material. Alternatively, the conducting layer comprises an organic conducting material such as polyacetylene, doped polyaniline and the like. Any metal that can conduct electricity may be suitable for use in this disclosure such as noble or coinage metals. Other examples of suitable metals include but are not limited to gold, silver, copper, platinum, palladium, lead, iron or the like and combinations thereof. Alternatively, the conducting layer comprises gold, silver or combinations thereof. Alloys or non-homogenous mixtures of such metals may also be used. The conducting shell layers may have a thickness that ranges from approximately 1 to 100 nm. The thickness of the shell layer may be engineered to generate a plasmon resonance frequency. The shell layer may coat the adjacent inner layer fully and uniformly or may partially coat that layer with atomic or molecular clusters. In either embodiment, at least approximately 30% of the adjacent inner layer is coated by the conducting layer. Such nanoshells comprising a nonconductive inner core and an electrically conductive outer shell and methods of engineering said particles such that they generate a plasmon resonance frequency are described in U.S. Pat. Nos. 6,344,272; 6,699,724; and 7,147,687, each of which is incorporated by reference herein in its entirety.

A method of preparing a nanoegg may initiate with the immobilizing or affixing of a precursor nanoparticle (e.g., nanoshell) on a support material or substrate. The support material may be any material compatible with the components of the process. In some embodiments, the support material may comprise inorganic oxides such as oxides of aluminum or silicon which are functionalized using a surface modifier such as for example and without limitation poly(4-vinylpyridine). The immobilized nanoshells may form a dispersed submonolayer on the support material.

In an embodiment, the method further comprises the deposition of conductive material onto the immobilized nanoshell. In an embodiment, the conductive material deposited onto the immobilized nanoshell is the same as the material used to form the shell layer of the nanoshell. In other embodiments, the conductive material deposited onto the immobilized nanoshell is different from the material used to form the shell layer of the nanoshell. The deposition of the conductive material may be carried out using any technique or methodology for the deposition of a conductive material onto the surface of a nanoshell and compatible with the components of the nanoshell. Alternatively, the deposition of the conductive material may be carried out by reductive precipitation of a precursor to the conductive material.

In a reductive precipitation embodiment, a metal salt comprising a conductive metal is contacted with the immobilized nanoshells. For example, the immobilized nanoshells may be immersed in a conductive metal salt solution (e.g., a solution of $HAuCl_4$). Examples of suitable metal salt solutions include without limitation $AgNO_3$, $Cu(NO_3)_2$, $CuSO_4$, and $Ni(NO_3)_2$. A reducing agent may be added to the metal salt solution to reduce the metal salt. Any reducing agent compatible with the reaction components and able to cause the reductive precipitation of the metal may be employed. The choice of reducing agent will depend on the nature of metal salt solution employed and as such may be chosen by one of ordinary skill in the art to meet the needs of the process. For example, when the metal salt solution comprises $HAuCl_4$ the reducing agent may comprise formaldehyde.

In other embodiments, the nanoegg may be subjected to a plurality of affixing/immobilizing and/or deposition steps. For example, a precursor nanoparticle (e.g., nanoshell) may be affixed or immobilized on a support material or substrate, additional conductive material may be deposited onto the immobilized nanoshell to form a nanoegg, the nanoegg may optionally be mobilized and/or removed from the support material, the nanoegg may be reaffixed/re-immobilized on the same or different support material, and the same or a different conductive material may be deposited on the reaffixed nanoegg. Such affixing and depositing steps may be repeated any number of time using the same or different conducting materials from successive iterations. Furthermore, the depositing step may be carried out multiple times following the initial fixation of the nanoshell to the support or may be carried out a nanoegg that was previously removed from a support material. For example, in an embodiment, a nanoegg may be subjected to at least one additional contacting with a metal salt and reducing agent to allow for the deposition of additional metal onto the nanoegg. These additional contacting or deposition steps may be carried out using an immobilized nanoegg, alternatively the nanoegg may not be immobilized. In an embodiment, additional contacting or deposition steps may employ a conductive material that is the same as the conductive material initially deposited onto the nanoshell. Other embodiments may employ a conductive material that is different from the conductive material initially deposited onto the nanoshell. In some embodiments, the nanoegg may be further processed such as by rinsing and drying before being employed in a user-desired application.

Variations in the deposition conditions (e.g., the number, time, and location that additional material is deposited on the nanoshell, for example via contact with the metal solution and reducing agent) may result in variations in the amount and position of conductive material deposited. Following deposition of the conductive material on the immobilized nanoshell, the resultant nanoparticle having this nonconcentric core and shell layer is referred to as a nanoegg. Without wishing to be limited by theory, immobilizing the nanoshell on a support material prior to depositing additional conductive material on the nanoshell shields a portion of the nanoshell adjacent the support material, thereby limiting the amount of additional conductive material that is deposited on the shielded side and producing an asymmetric shell layer.

Figure 1A:
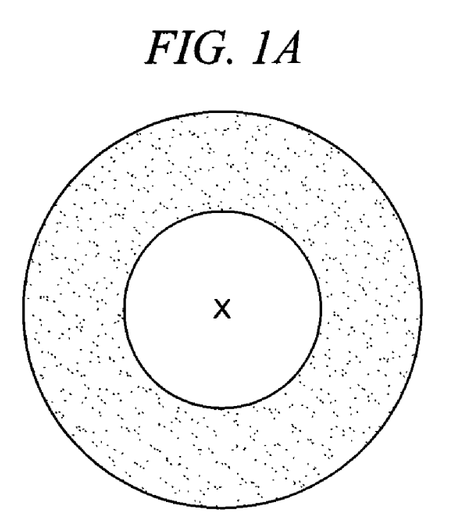
FIG. 1A is a representation of a nanoparticle having a concentric core and shell layer.
Figure 1B:
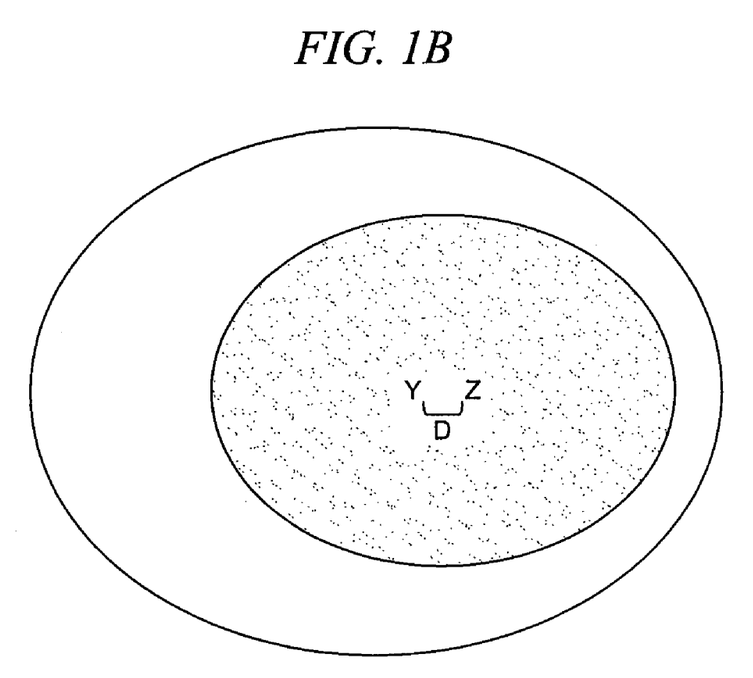
FIG. 1B is a representation of a nanoparticle having a nonconcentric core and shell layer.

In an embodiment, a nanoegg prepared as described herein has an outer shell layer with a center that is displaced or offset with respect to the core enter. This is illustrated in FIG. 1A which depicts a nanoshell, having a concentric core and shell layer denoted X, while FIG. 1B depicts a nanoegg having a shell layer center Z that is offset with respect to the core layer Y. The difference between Y and Z or the amount of the center offset is denoted D, which may also be referred to as the offset distance. Herein the center of the nanoparticle refers to the center of mass. The average diameter of an object, such as nanoegg, having a surface defining the extent of the object is defined herein as the angular average of the distance between opposing regions of the surface through a fixed point located interior to the object. For an object embedded in three dimensions, described for example by a radial coordinate system centered at the fixed point, the average is over both the radial angle, $\theta$ and the azimuthal angle, $\phi$. This is described in U.S. Pat. No. 7,144,622 which is incorporated by reference herein in its entirety. The center of the core and shell layers may be determined using any methodology or technique known to one of ordinary skill in the art for ascertaining the center of the core and shell layers. For example, the center of the core and shell layers may be determined by Transmission Electron Microscopy (TEM).

In an embodiment D is from about 1 to about 30 nm, alternatively from about 10 to about 30, alternatively from about 20 to about 30. The value of D will depend on the amount of conductive material (e.g., metal) deposited onto the surface of the nanoshell which in turn depends on a variety of factors including for example the length of reaction time. Such factors may be varied by one of ordinary skill in the art to adjust the value of D.

In an embodiment, offsetting of the core and shell centers result in a reduced symmetry that may provide enhanced optical properties attributable to alterations in the selection rules for the optical properties of these structures. Without wishing to be limited by theory, the plasmon hybridization method can be used to describe the plasmonic properties of the nanoshell structure under reduced symmetry. The conduction electrons are considered to be a charged, incompressible liquid of uniform density on top of a rigid, positive charge representing the ion cores. The ion cores are treated within the jellium approximation, so the positive background charge is assumed to be uniformly distributed within the particle's boundaries. Plasmon modes are self-sustained deformations of the electron liquid. Because the liquid is incompressible, the only electromagnetic effect associated with such deformations is the appearance of surface charges.

Figure 2A:
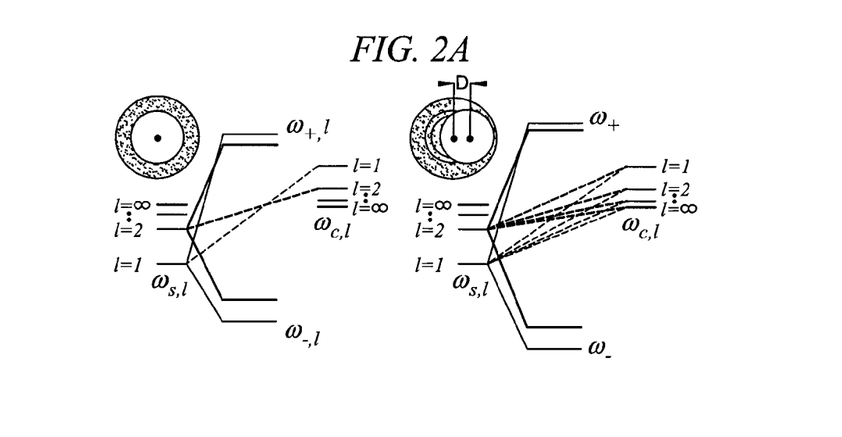
FIG. 2A is depiction of nanoparticles having concentric and nonconcentric core and shell layers and their resulting plasmon modes.

A nanoegg with a dielectric core of radius a displaced a distance D from the center of an outer shell of radius b can be denoted (a, b, D) and is schematically illustrated as an extension of the spherically symmetric nanoshell geometry in FIG. 2a. The conduction electron density in the shell is assumed to be uniform $n_0$ corresponding to a bulk plasmon frequency $$\omega_B = \sqrt{\frac{4\pi n_0 e^2}{m_e}}. \qquad [1]$$

For simplicity, in FIG. 2a, we assume a vacuum core and neglect the polarizability of the positive background of the metal. The deformation field can be expressed as a gradient of a scalar potential $\eta$, which takes the form:

$$\eta(r_C, \Omega_C, r_S, \Omega_S) = \qquad [2]$$

$$\sum_{lm} \left[ \sqrt{\frac{a^{2l+1}}{l+1}} \dot{C}_{lm}(t) r_C^{-l-1} Y_{lm}(\Omega_C) + \sqrt{\frac{1}{lb^{2l+1}}} \dot{S}_{lm}(t) r_S^l Y_{lm}(\Omega_S) \right],$$

where $(r_C, \Omega_C)$ are spherical coordinates centered in the cavity, and $(r_S, \Omega_S)$ are spherical coordinates with an origin at the center of the spherical outer shell. The quantities of $C_{lm}$ and $S_{lm}$ are the amplitudes of the primitive cavity and sphere plasmons, respectively. For finite offset D, the spherical harmonics centered on the two different origins are no longer orthogonal for different l, resulting in interactions between the cavity and sphere modes in a manner analogous to the coupling between the individual nanoparticle plasmons of a nanoparticle dimer or in periodic structures of metallic nanoparticles in close proximity. As in the case of nanoparticle dimers, the azimuthal index m remains conserved.

The Lagrangian for this system can be constructed directly from $\eta$. The structure of the resulting eigenvalue problem is illustrated in FIG. 2a. The cavity plasmons have energies $$\omega_{C,l} = \omega_B \sqrt{\frac{l+1}{2l+1}}, \qquad [3]$$

and the sphere plasmons have energies $$\omega_{S,l} = \omega_B \sqrt{\frac{l}{2l+1}}. \qquad [4]$$

Figure 2B:
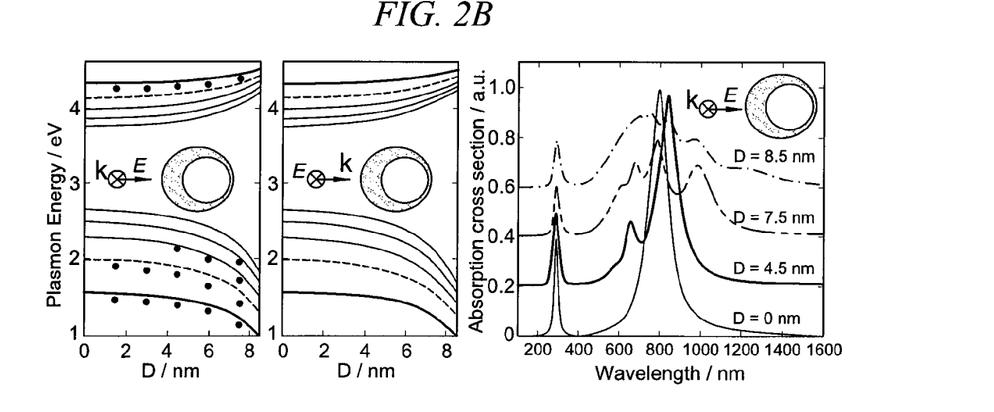
FIG. 2B is a depiction of the surface plasmon modes of nanoparticles having concentric and nonconcentric core and shell layers and the absorption spectrum of a nanoparticle having a nonconcentric (offset) core and shell layer as a function of the offset.
Figure 2C:
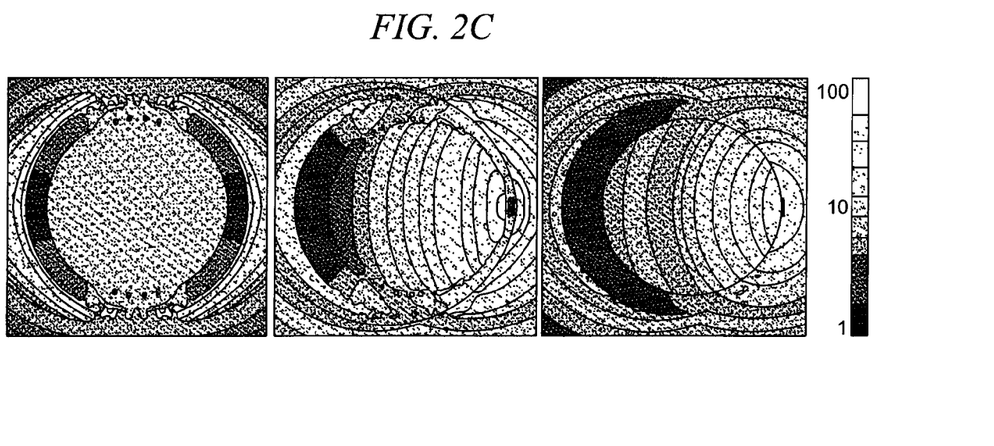
FIG. 2C depicts calculated electric field enhancements for a nonconcentric nanoparticle.

FIG. 2A Left shows the resulting plasmon modes for a spherically symmetric nanoshell. The interaction is diagonal in multipolar index lm, where both bonding and antibonding nanoshell plasmon modes are formed for each lm. The plasmon energies depend on multipolar index l but not on the azimuthal index m, which labels the 2 l+1 possible orientations of the plasmon modes. For finite offset D (FIG. 2A Right), an interaction exists between all cavity and sphere modes of the same m. This interaction leads to stronger hybridization and an admixture of all primitive cavity and sphere plasmons in the plasmon modes of the reduced-symmetry nanostructure. For simplicity, we will refer to these reduced symmetry nanoparticle plasmon modes by multipolar index l, corresponding to the spherical or zero offset case, although for finite offset the plasmon modes contain an admixture of plasmons of all l for a given m. For the nanoegg, the coupling of the cavity and sphere plasmons depends on azimuthal m, but the resulting plasmon energy spectrum is only weakly dependent on orientation. In FIG. 2B Left and Center, the shifts in the plasmon modes deriving from the nanoshell l=1–5 bonding and antibonding plasmon modes as a function of increasing offset D, for the two orthogonal polarizations of incident light excitation are shown. The figure shows a strong redshift of the bonding and blueshift of the antibonding plasmon modes with increasing D. Also observed are the plasmon modes for the two principal polarization axes evolve with increasing offset in an extremely similar fashion. In FIG. 2B Left, is plotted the plasmon resonances obtained by a peak extraction from the extinction spectra calculated by using the finite difference time domain (FDTD) method. The FDTD method is a powerful numerical approach that has recently been shown to be highly useful in the study of the electromagnetic properties of metallic nanostructures of almost arbitrary complexity. The FDTD simulations show geometry-dependent plasmon energy shifts, which are in good agreement with the conceptually simpler and more intuitive picture provided by the plasmon hybridization approach. In FIG. 2B Right, are shown the theoretical optical absorption spectra for various offset values D for an incident polarization direction corresponding to FIG. 2B Lett. As D increases, the l=1 mode is redshifted, and the higher l modes, now dipole active, contribute additional peaks to the spectrum, increasing in complexity with increasing D. In FIG. 2C, is shown the electric field enhancements calculated using the FDTD method for nanoeggs with a silica core with the metallic shell modeled using the empirically obtained dielectric function for Au. The calculation shows very large field intensity enhancements, of magnitudes comparable with those attainable in nanoparticle dimer junctions and fabricated bowtie nanoantennas. However, in contrast to those geometries, here the region of maximum field enhancement is located on the open, exterior surface of an individual nanostructure and not within a narrow confined gap or junction.

The offsetting of the core and shell layers may result in the nanoegg having an electromagnetic field strength that is altered in both the near-field and far-field regions for a given frequency.

In an embodiment, the nanoeggs of this disclosure display enhanced local field optical properties in the visible and NIR. Specifically, the optical spectrum of the nanoegg in the visible and NIR may be broadened and comprise additional peaks adjacent to the original dipolar plasmon resonance. In an embodiment, the local field enhancements on the surface of a nanoegg may be increased relative to those on the surface of a nanoshell. The enhancements may result in an increased intensity will vary depending on the nature of the core and shell layers. For example, a gold nanoegg may display an intensity increase (i.e. enhancement) of from about 20 to about 80 wherein the intensity increase is a dimensionless number that represents the ratio of incident light intensity to the intensity of the particle response. Alternatively, these local field enhancements may result in an alteration of the spectral window such that the spectral envelope of the plasmonic features of the nanoegg are shifted with respect the spectral envelope of the plasmonic features of the nanoshell. The shift may be to shorter (blueshift) or longer (redshift) wavelengths. Alternatively, these local field enhancements may result in the appearance of additional absorption features such that the absorption spectra of the nanoeggs display additional absorption peaks and appears as a more complex spectra when compared to the spectra of a nanoshell acquired under similar conditions.

In an embodiment, the nanoeggs of this disclosure display far field optical properties that are not observable with concentric nanoshells. These additional optical features may allow for greater flexibility in the utilization of the nanoeggs as sensor devices.

In an embodiment, an adsorbate may be associated with any of the nanoparticles described in this disclosure. It is to be understood that the term adsorbate is not meant to limit the materials that associate with the nanoparticles to those that may be adsorbed onto the nanoparticle. It is contemplated that the materials may be associated with the nanoparticle through any number and type of interactions (e.g., electrostatic, chemical). The optical properties of the adsorbate may be enhanced by association with the nanoparticle. For example, association of an adsorbate with a nanoparticle may result in interactions between the plasmon resonance of the nanoparticle and the absorption features of the adsorbate that generates or modifies a surface enhanced Raman scattering (SERS) spectral response of the adsorbate. In an embodiment, a nanoegg having an adsorbate associated with the surface of the particle may lead to an enhanced SERS response when compared to an otherwise identical adsorbate associated with a nanoshell. In some embodiments, the SERS enhancement of an adsorbate associated with a nanoegg may range from greater than about $10^7$ to about $10^{10}$, alternatively from $10^8$ to about $10^{10}$, alternatively from $10^9$ to about $10^{10}$. Without wishing to be limited by theory, the asymmetric placement of the core inside the shell of the nanoegg results in larger electromagnetic field enhancements on the surface of the nanoparticle than are achievable with a symmetric nanostructure. This is attributable to relaxation of selection rules that has been described previously herein and in U.S. patent application Ser. No. 11/762,430 entitled "An All Optical Nanoscale Sensor" filed Jun. 13, 2007 and incorporated by reference herein in its entirety.

The plasmon resonant frequency of the nanoeggs of this disclosure can be engineered to provide structures having enhanced optical properties when compared to their symmetrical counterparts. The tunable plasmon frequency allows one skilled in the art to design nanoeggs plasmon resonances that individually have enhanced optical properties and may provide enhancements in the SERS spectral properties of an adsorbate associated with the nanoegg.

The unique properties of this new nanostructure are highly attractive for applications such as standalone nanosensors exploiting surface-enhanced spectroscopies or SPR sensing modalities. Applying the plasmon hybridization model as design principles to realizable nanostructures will result in the selective implementation of optimized optical properties into structures and devices of mesoscale dimensions. Such a near infrared optimized nanosensor for electromagnetic emission spectroscopy is likely to be of utility in a variety of biological studies and biomedical applications, such as bioassays, intracellular spectroscopy and molecular level diagnosis of early stage cancer.

A nanoegg of this disclosure may function as an all-optical sensor with the ability to detect and/or report chemical or physical alterations of an environment. Individual nanoeggs may function as sensors; alternatively aggregates of the nanoeggs may function as sensors. In an embodiment, the nanoegg functions as a nanosensor that may be embedded in an organism whose tissues or cells are experiencing a dysfunction or disorder. The nanoegg may be localized to specific cellular types such as for example neoplastic cells or cells having comprised cellular functions and may provide a means of measuring alterations in said environments. For example, a nanoegg associated with an adsorbate may be introduced to a cellular environment and the Raman spectra of the adsorbate acquired utilizing excitation by a laser device in vivo with subsequent detection of the SERS spectrum of the adsorbate. The SERS spectrum of the adsorbate may be detected by a device located in vivo in proximity to the nanoegg and capable of receiving and transmitting SERS spectral data.

In yet other embodiments, the nanoegg and/or nanoegg associated with an adsorbate may be employed as a sensor in vitro. Additional uses for the nanoeggs of this disclosure would be apparent to one of ordinary skill in the art.

REFERENCES

The following references provide background information and are each incorporated herein by reference, except to the extent that they define terms differently than those terms are defined herein:

1. Link, S. & El-Sayed, M. A. (1999) *J. Phys. Chem. B* 103, 8410-8426
2. Murphy, C. J., Sau, T. K., Gole, A. & Orendorff, C. J. (2005) *MRS Bull.* 30, 349-355
3. Aizpurua, J., Hanarp, P., Sutherland, D. S., Kall, M., Bryant, G. W. & de Abajo, F. J. G. (2003) *Phys. Rev. Lett.* 90, 057401
4. Sun, Y. G. & Xia, Y. N. (2002) *Science* 298, 2176-2179
5. Sherry, L. J., Chang, S. H., Schatz, G. C., Van Duyne, R. P., Wiley, B. J. & Xia, Y. N. (2005) *Nano Lett.* 5, 2034-2038
6. Chen, S. H. & Carroll, D. L. (2002) *Nano Lett.* 2, 1003-1007
7. Jin, R. C., Cao, Y. W., Mirkin, C. A., Kelly, K. L., Schatz, G. C. & Zheng, J. G. (2001) *Science* 294, 1901-1903
8. Pastoriza-Santos, I. & Liz-Marzan, L. M. (2002) *Nano Lett.* 2, 903-905
9. Oldenburg, S. J., Averitt, R. D., Westcott, S. L. & Halas, N. J. (1998) *Chem. Phys. Lett.* 288, 243-247
10. Chen, S. H., Wang, Z. L., Ballato, J., Foulger, S. H. & Carroll, D. L. (2003) *J. Am. Chem. Soc.* 125, 16186-16187
11. Hao, E., Bailey, R. C., Schatz, G. C., Hupp, J. T. & Li, S. (2004) *Nano Lett.* 4, 327-330
12. Nie, S. & Emory, S. R. (1997) *Science* 275, 1102-1106
13. Kneipp, K., Wang, Y., Kneipp, H., Perelman, L. T., Itzkan, I., Dasari, R. R. & Feld, M. S. (1997) *Phys. Rev. Lett.* 78, 1667-1670
14. Xu, H. X., Bjerneld, E. J., Kall, M. & Borjesson, L. (1999) *Phys. Rev. Lett.* 83, 4357-4360
15. Xu, H. X. & Kall, M. (2003) *Chem. Phys. Chem.* 4, 1001-1005
16. Moskovits, M. & Jeong, D. H. (2004) *Chem. Phys. Lett.* 397, 91-95
17. Hirsch, L. R., Stafford, R. J., Bankson, J. A., Sershen, S. R., Rivera, B., Price, R. E., Hazle, J. D., Halas, N. J. & West, J. L. (2003) *Proc. Natl. Acad. Sci. USA* 100, 13549-13554
18. Loo, C., Lowery, A., Halas, N., West, J. & Drezek, R. (2005) *Nano Lett.* 5, 709-711
19. Loo, C., Hirsch, L., Lee, M. H., Chang, E., West, J., Halas, N. & Drezek, R. (2005) *Opt. Lett.* 30, 1012-1014
20. Sershen, S. R., Westcott, S. L., Halas, N. J. & West, J. L. (2000) *J. Biomed. Mater. Res.* 51, 293-298
21. Hirsch, L. R., Jackson, J. B., Lee, A., Halas, N. J. & West, J. (2003) *Anal. Chem.* 75, 2377-2381
22. Prodan, E., Radloff, C., Halas, N. J. & Nordlander, P. (2003) *Science* 302, 419-422
23. Prodan, E. & Nordlander, P. (2004) *J. Chem. Phys.* 120, 5444-5454
24. Marton, J. P. & Jordan, B. D. (1977) *Phys. Rev. B* 15, 1719-1727
25. Grady, N. K., Halas, N. J. & Nordlander, P. (2004) *Chem. Phys. Lett.* 399, 167-171
26. Ouyang, F. & Isaacson, M. (1989) *Ultramicroscopy* 31, 345-350
27. Fredkin, D. R. & Mayergoyz, I. D. (2003) *Phys. Rev. Lett.* 91, 253902
28. Shvets, G. & Urzhumov, Y. A. (2004) *Phys. Rev. Lett.* 93, 243902
29. Brandl, D. W., Oubre, C. & Nordlander, P. (2005) *J. Chem. Phys.* 123, 024701
30. Nordlander, P., Oubre, C., Prodan, E., Li, K. & Stockman, M. I. (2004) *Nano Lett.* 4, 899
31. Taflove, A. & Hagness, S. C. (2000) *Computational Electrodynamics: The Finite-Difference Time Domain Method* (Artech House, Norwood, Mass.).
32. Sullivan, D. M. (2000) *Electromagnetic Simulation Using the FDTD Method* (IEEE Press, Piscataway, N.J.).
33. Futamata, M., Maruyama, Y. & Ishikawa, M. (2003) *J. Phys. Chem. B* 107, 7607-7617
34. Oubre, C. & Nordlander, P. (2004) *J. Phys. Chem. B* 108, 17740-17747
35. Oubre, C. & Nordlander, P. (2005) *J. Phys. Chem. B* 109, 10042-10051
36. Maier, S. A., Kik, P. G. & Atwater, H. A. (2003) *Phys. Rev. B* 67, 205402
37. Johnson, P. B. & Christy, R. W. (1972) *Phys. Rev. B* 6, 4370-4379
38. Schuck, P. J., Fromm, D. P., Sundaramurthy, A., Kino, G. S. & Moerner, W. E. (2005) *Phys. Rev. Lett.* 94, 017402
39. Tam, F., Moran, C. E. & Halas, N. J. (2004) *J. Phys. Chem. B* 108, 17290-17294
40. Westcott, S. L., Jackson, J. B., Radloff, C. & Halas, N. J. (2002) *Phys. Rev. B* 66, 155431

EXAMPLES

The various embodiments having been described, the following examples are given as particular embodiments and to demonstrate the practice and advantages thereof. It is understood that the examples are given by way of illustration and are not intended to limit the specification or the claims in any manner.

Example 1

Figures 3A, 3B:
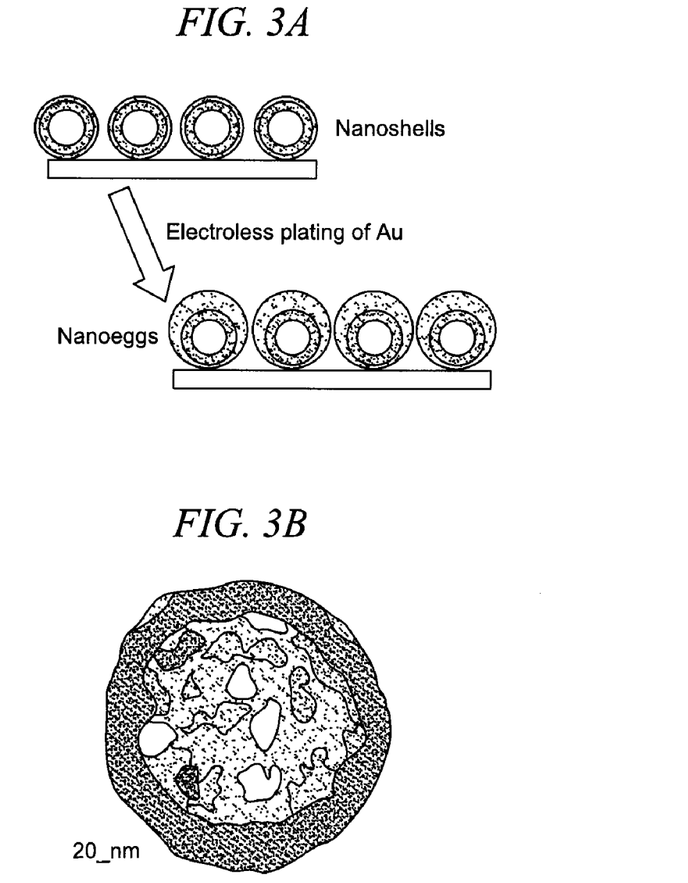
FIG. 3A is a schematic of an electroless plating technique for the fabrication of a nonconcentric nanoparticle.
FIG. 3B is a transmission electron micrograph of nanoparticles having concentric core and shell layers.

Nanoshells with an offset core were experimentally fabricated by using an asymmetric electroless plating technique, see FIG. 3A. Tetraethyl orthosilicate (TEOS; 99.9999%), (3-aminopropyl)trimethoxysilane (APTMS), tetrachloroauric acid ($HAuCl_4$), and PVP (160,000 MW) were purchased from Sigma-Aldrich. Ammonium hydroxide, potassium carbonate ($K_2CO_3$), and ethanol were purchased from Fisher Scientific. Ultrapure water (18.2 MΩ resistivity) was obtained from a Milli-Q water purification system (Millipore). Glass microscope slides were obtained from Gold Seal Products (Portsmouth, N.H.). All of the chemicals were used as received without further purification. Concentric silica core-Au shell nanoparticles were fabricated following a reported seed-mediated electroless plating method and then were immobilized onto PVP-functionalized glass substrates as a monolayer of isolated nanoshells. The nanoshells used were 94±9 nm in core radius and 9±1 nm in shell thickness. Specifically, nanoshells with an offset core were fabricated by immersing the nanoshell films in 9 ml of aqueous solution containing 1 mM $HAuCl_4$ and 3.5 mM $K_2CO_3$, where the addition of 20 μl of 37% formaldehyde then initiated the electroless plating of Au onto the nanoparticle surfaces. The films were subsequently removed from the plating solution after a certain period of reaction time, rinsed with ethanol, and dried with nitrogen gas flow. All of the nanoegg particles fabricated in this manner had the same orientation on the glass slides, with the point in contact with the glass substrate corresponding to the minimum shell thickness for each nanoegg particle. Increasing the reaction time of the plating process increases the effective core offset of the nanoeggs. The morphologies and ensemble optical properties of the products were characterized by scanning electron microscope (SEM), TEM, and UV-visible (vis)-NIR spectroscopic measurements. SEM images were obtained on a Philips FEI XL-30 environmental SEM at an acceleration voltage of 30 kV. TEM images were obtained by using JEOL JEM-2010 TEM. The extinction spectra were measured by using a Cary 5000 UV-vis-NIR spectrophotometer (Varian) in the wavelength range of 400-1,500 nm.

Figure 3C:
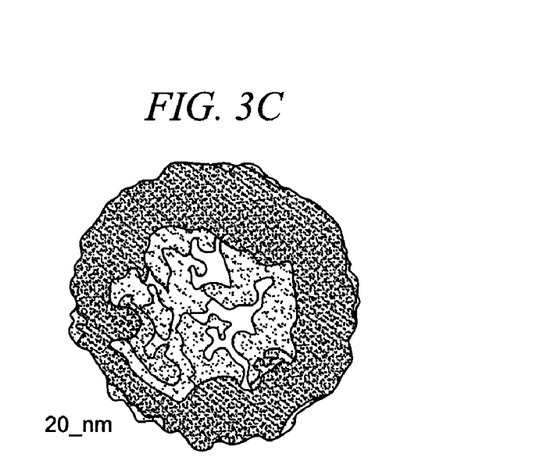
FIG. 3C is a transmission electron micrograph of nanoparticles having nonconcentric core and shell layers.
Figure 3D:
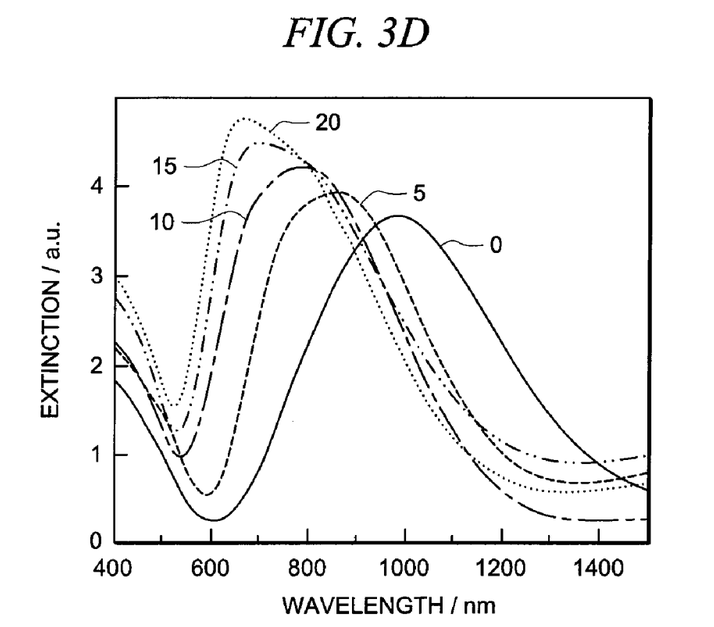
FIG. 3D is a plot of the extinction spectra of the oriented nanoeggs of Example 1 as a function of core offset.
Figure 3E:
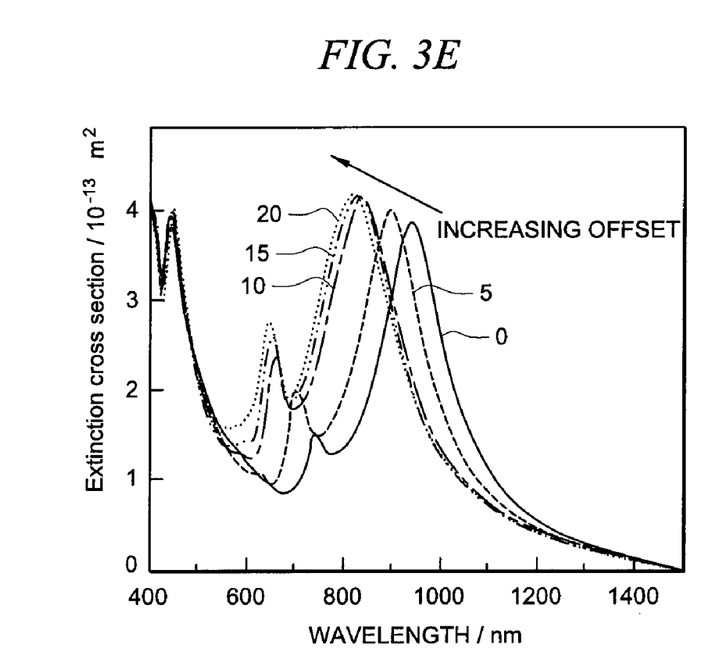
FIG. 3E are finite difference time domain calculated extinction spectra for the nanoeggs of Example 1 as a function of core offset.

FIGS. 3B and 3C shows typical transmission electron microcopy (TEM) images of a concentric nanoshell with homogenous shell thickness of 9 nm and a nanoegg with a core offset of 10 nm, respectively. In FIG. 3D, the evolution of the extinction spectra of the oriented nanoegg films as a function of electroless plating time (i.e. reaction time) is shown where the reaction time was 0, 5, 10, 15 or 20 minutes as indicated. These measurements were performed on nanoegg films by using normal incidence, unpolarized light. The spectral envelope of the plasmonic features shifted to shorter wavelengths as the reaction time increased. This trend is in good agreement with FDTD calculations; see FIG. 3E, which also show a spectral peak blueshift with increasing core offset, for the same orientation of core offset with respect to incident light. In these ensemble measurements, the plasmon peaks are significantly and asymmetrically broadened in comparison with the calculated spectra, because of the distribution in sizes and offsets in the fabricated nanostructures.

Example 2

The evolution of the plasmon energies of these reduced symmetry nanostructures were investigated by performing dark-field spectroscopic measurements on isolated, individual, randomly oriented nanoeggs in reflection mode. Dark-field single particle spectroscopic measurements were performed by using an inverted microscope (Zeiss Axiovert 200 MAT). A reflection dark-field objective (10×, numerical aperture 0.9) was used to focus the image of each single nanoparticle at the entrance slit of a spectrograph (SP-2165; Acton Research, Acton, Mass.), and data were collected with a charge-coupled device array (PhotonMax 512; Princeton Instruments, Trenton, N.J.). For these measurements, a sample of nanoeggs was prepared where, after fabrication, the immobilized nanoparticles were removed from the substrate and released into an aqueous solution by application of an ultrasonic probe. The nanostructures then were dispersed by spin-coating onto a PVP-coated glass substrate. Spectra were all acquired in ambient air. The spectrum of an area of the sample containing no nanoparticles was subtracted from the nanoparticle spectrum for background correction, and the nanoparticle spectra were divided by a white-light calibration standard spectrum (Edmund Optics, Barrington, N.J.) to correct for any possible wavelength-dependent variations in collection efficiencies in the system.

Figure 4:
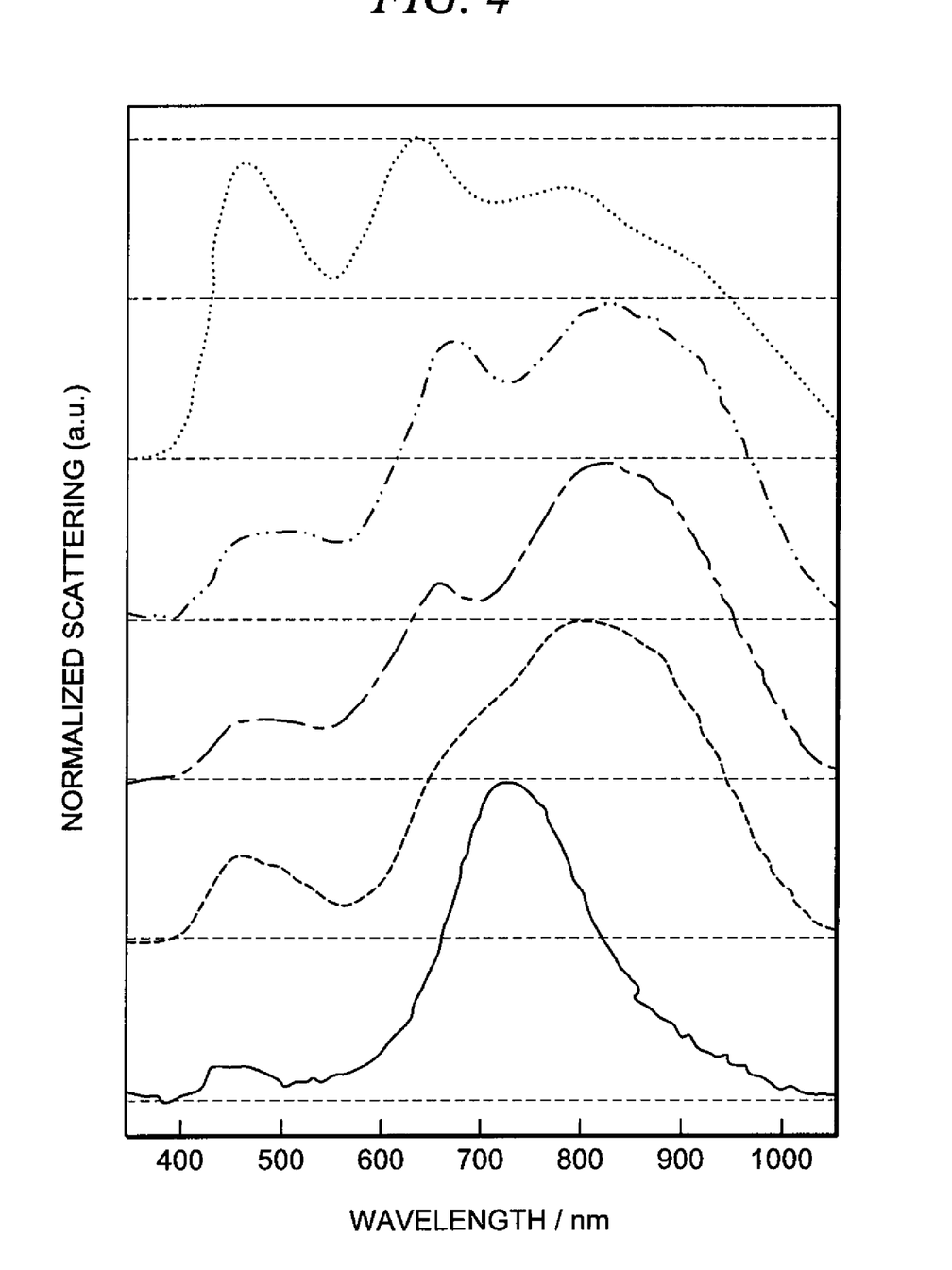
FIG. 4 is a plot of the extinction spectra of an individual nanoegg as a function of core offset.

A sequence of single particle spectra is shown in FIG. 4. The lowest spectrum is that of a single nanoshell, accompanied by representative spectra of reduced symmetry nanoparticles, each displaced vertically for clarity. The sequence of spectra shown with increasing vertical displacement corresponds to that of increasing offset D. The nanoshell bonding plasmon was seen at 730 nm and was accompanied by a much smaller broad peak at nominally 450 nm corresponding to the antibonding plasmon. For reduced symmetry nanoparticles, the onset and development of multipeaked spectra of increasing complexity was accompanied by an overall redshift of the spectral envelope. Additionally, the antibonding plasmon peak became broader and eventually quite large, of similar magnitude as the accompanying lower energy modes in the nanoparticle spectrum. The peak positions and lineshapes vary significantly as the core offset changes. These single-particle spectra bear a striking qualitative resemblance to the theoretically calculated spectra shown in FIG. 2B. The presence of a dielectric substrate, the dark-field optical excitation and collection geometry, and phase-retardation effects may affect the spectral widths observed for the experimentally fabricated nanoparticles relative to the theoretical spectra in FIG. 2B. Within experimental error, the fabricated nanoparticles have effective core offsets around D=3.3 nm and therefore correspond exactly to the regime where additional hybridized peaks should appear in the theoretical spectra.

In conclusion, the results demonstrate that symmetry breaking can strongly modify the selection rules for the interaction of plasmon modes on an individual nanoparticle. Without wishing to be limited by theory, this finding has profound consequences for the optical spectrum of the particle, allowing all plasmon modes to possess some dipolar character and contribute to additional features in the optical spectrum as symmetry is reduced. For concentric nanoshells, reduction in symmetry also is accompanied by an increased electromagnetic field enhancement on its external surface, located at the narrowest region of shell thickness. This approach may be useful in analyzing and understanding the local- and far-field optical response of other reduced-symmetry nanostructures of even greater complexity and, ultimately, in the design of various nanoparticle geometries with specific near-field optical properties.

While various embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A nanoparticle comprising a shell surrounding a core material with a lower conductivity than the shell material, wherein the core center is offset in relation to the shell center, and wherein the nanoparticle has a visible and near infrared spectra comprising additional peaks adjacent to the dipolar plasmon resonances when compared to an otherwise identical nanoparticle having a concentric core and shell and wherein the offset is from about 1 nm to about 30 nm wherein the shell fully coats the core.

2. The nanoparticle of claim 1 wherein the core comprises silicon dioxide, gold sulfide, titanium dioxide, polymethyl methacrylate (PMMA), polystyrene, hydrogels, macromolecules or combinations thereof.

3. The nanoparticle of claim 1 wherein the shell comprises gold, silver, copper, platinum, palladium, lead, iron or combinations thereof.

4. The nanoparticle of claim 1 having enhanced near-field optical properties when compared to an otherwise identical nanoparticle having a concentric core and shell.

5. The nanoparticle of claim 4 wherein the enhanced near-field optical properties result in an increase in intensity of from about 20 to about 80.

6. The nanoparticle of claim 1 having far-field optical properties when compared to an otherwise identical nanoparticle having a concentric core and shell.

7. The nanoparticle of claim 1 further comprising an adsorbate having one or more optical properties.

8. The nanoparticle of claim 7 wherein one or more of the optical properties of the adsorbate are enhanced when compared to an otherwise identical nanoparticle having a concentric core and shell.

9. The nanoparticle of claim 8 wherein the enhanced optical properties comprise an enhanced surface Raman scattering (SERS) spectral response.

10. The nanoparticle of claim 9 wherein the SERS enhancements range from greater than about $10^7$ to about $10^{10}$.

11. The nanoparticle of claim 9 wherein the adsorbate has a chemically and/or physically responsive SERS spectrum.

12. The nanoparticle of claim 9 wherein the SERS enhancements range from about $10^9$ to about $10^{10}$.

13. The nanoparticle of claim 1 wherein the nanoparticle is operable as a sensor device.

14. The nanoparticle of claim 13 wherein the sensor is an all-optical sensor.

15. The nanoparticle of claim 13 wherein the sensor comprises an individual nanoparticle.

16. The nanoparticle of claim 13 wherein the sensor comprises an aggregate of nanoparticles.

17. The nanoparticle of claim 1 wherein the shell comprises polyacetylene, doped polyaniline, or combinations thereof.

18. The nanoparticle of claim 1 wherein the shell has a thickness of from approximately 1 nm to 100 nm.

19. The nanoparticle of claim 1 wherein the nanoparticle has reduced symmetry nanoparticle plasmon modes.

20. The nanoparticle of claim 1 wherein the nanoparticle is a component in a bioassay, intracellular spectroscopy, molecular level diagnosis of early stage cancer, or combinations thereof.

21. The nanoparticle of claim 1 wherein the nanoparticle is embedded in an organism experiencing a dysfunction or disorder.

22. The nanoparticle of claim 21 wherein the dysfunction or disorder comprises cancer.

* * * * *